April 3, 1962 O. C. SEVERSON 3,027,623
CLAMP-TYPE HOLDER FOR THROW-AWAY
AND INDEXIBLE CUTTING INSERTS
Filed June 25, 1959 2 Sheets-Sheet 2
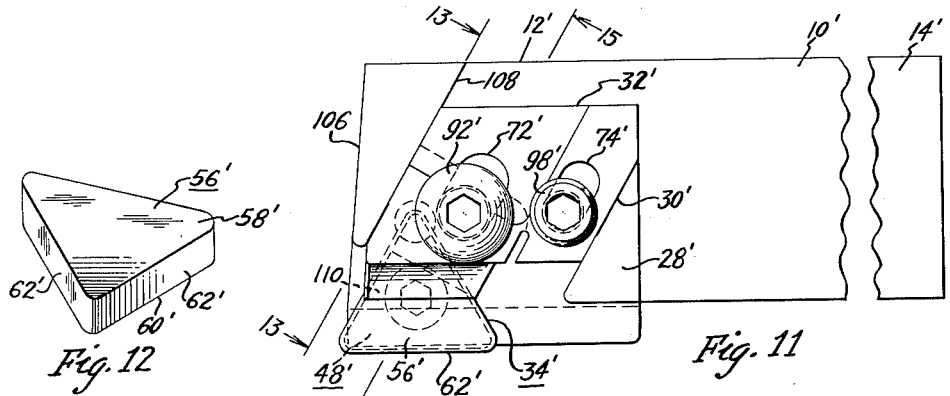
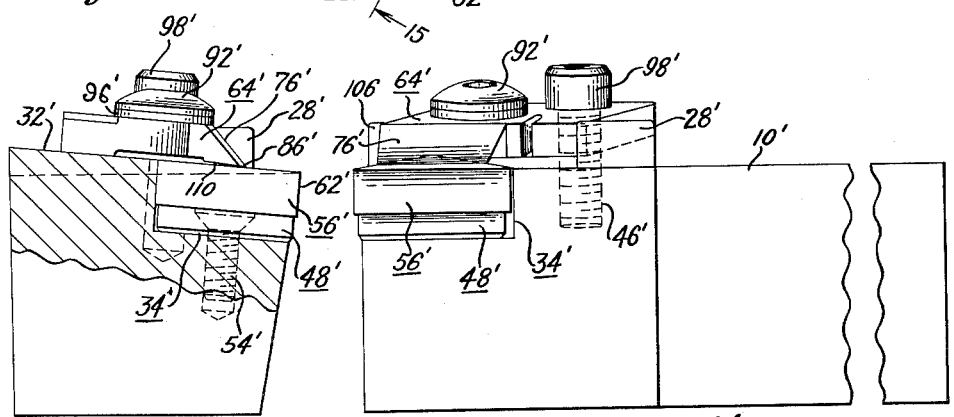
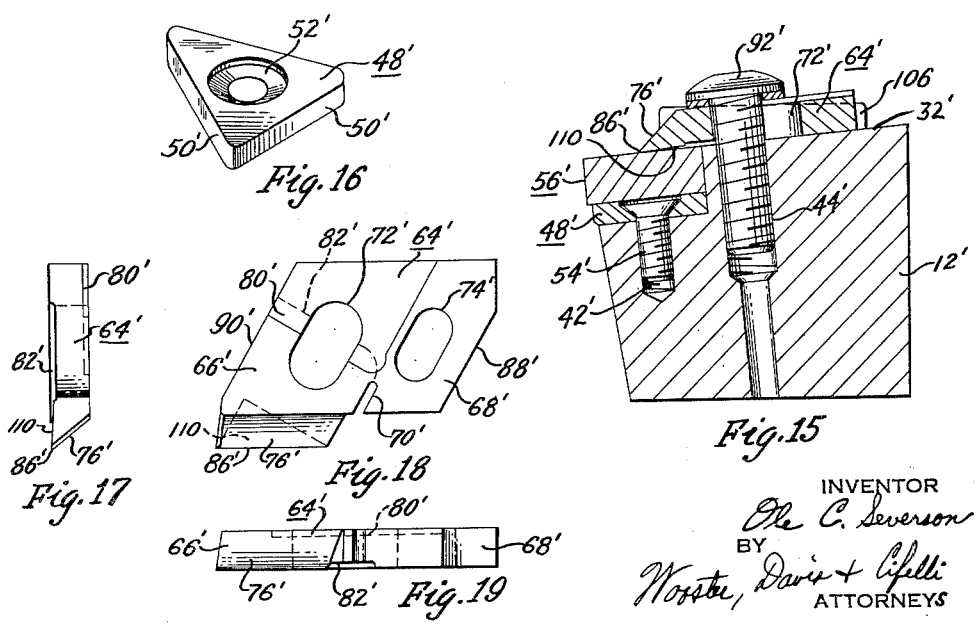
INVENTOR
Ole C. Severson
BY
Wooster, Davis & Cifelli
ATTORNEYS

United States Patent Office 3,027,623
Patented Apr. 3, 1962

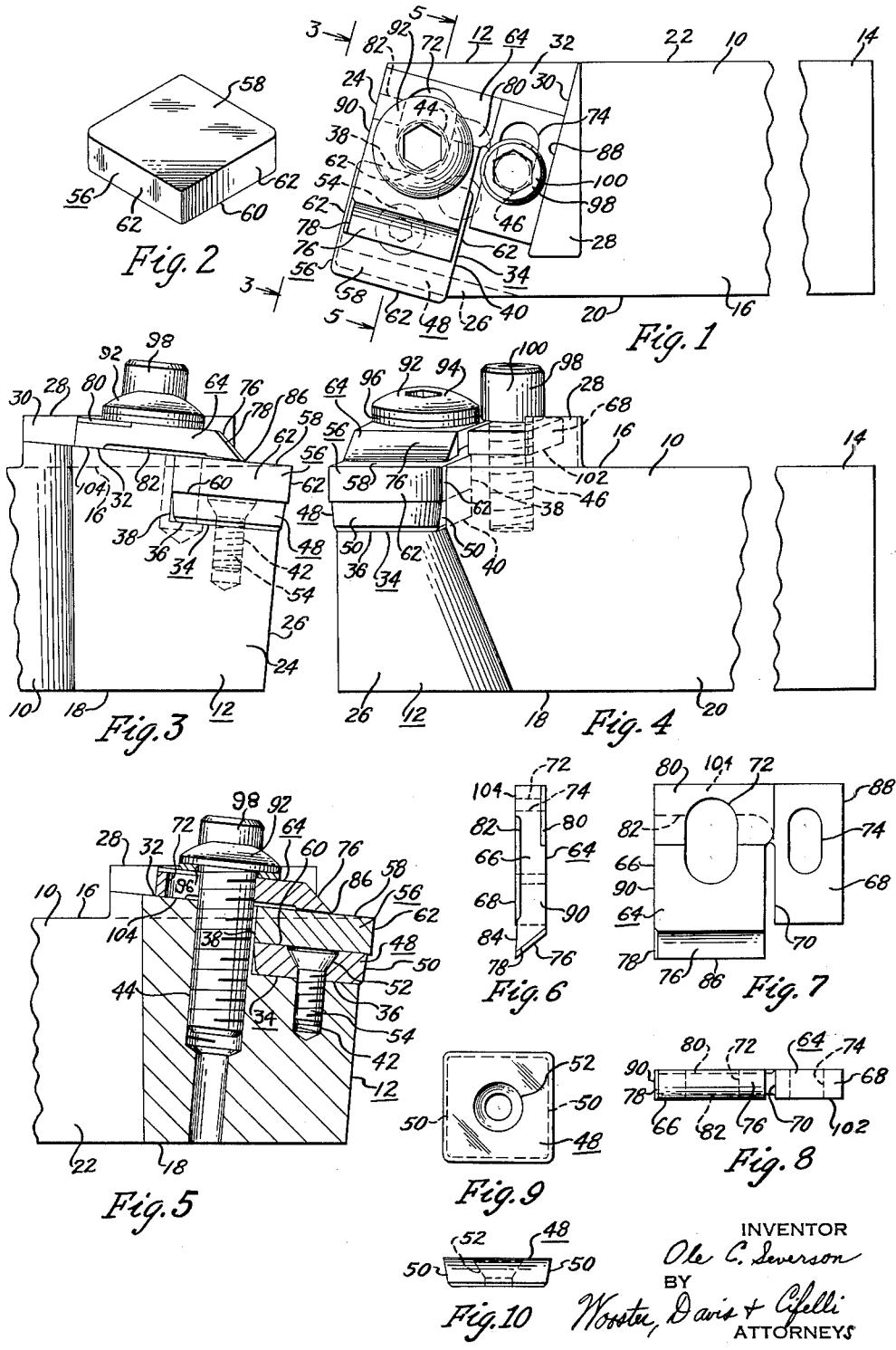

3,027,623
CLAMP-TYPE HOLDER FOR THROW-AWAY AND INDEXIBLE CUTTING INSERTS
Ole C. Severson, Shelton, Conn., assignor to The Viking Tool Company, Shelton, Conn., a corporation of Connecticut
Filed June 25, 1959, Ser. No. 822,844
5 Claims. (Cl. 29—96)

This invention relates to metal cutting assemblies for high speed metal cutting machine tools, and particularly to such assemblies having tool holders and separate cutters.

In high speed metal machining, many problems exist pertaining to the construction, use and maintenance of the metal cutting means. The metal cutting means is usually in the form of a cutter made of an extremely hard material, such as tungsten carbide, hardened steel or the like, and these materials inherently create problems due to their brittleness and costliness. In order to alleviate these problems, separate cutters which are mounted in tool holders have been employed; however, many new problems pertaining to the construction, use and maintenance of these separate cutters have arisen. For example, the initial and continued proper mounting of the separate cutters at a minimum cost and time is difficult to achieve. Also, extending the life of and the avoidance of breakage of these expensive separate cutters and their associated parts is a problem that constantly receives attention from the art. Further, the need for the provision of satisfactory chip-breaking is hard to satisfy.

It is an object of the invention to provide an improved metal cutting assembly comprising a tool holder and separate cutter for high speed metal cutting machine tools, which is economical to construct and maintain, and effective and efficient in operation. Such separate cutters will hereinafter be referred to as cutting inserts.

It is another object of the invention to provide an improved tool holder for use with indexible, disposable and replaceable cutting inserts.

It is another object of the invention to provide an improved tool holder, particularly for cutting inserts which are extremely hard and brittle, wherein the cutting insert is held in a rigid, positive and strain-free manner, thereby allowing cuts to be taken up to the full inherent strength of the cutting insert material and yet minimize breakage.

It is another object of the invention to provide an improved tool holder wherein mechanical locking means for the cutting insert is provided which facilitates changing or adjustment of the cutting insert when it becomes dull, and wherein it is not necessary to remove the tool holder from its support when mounting, adjusting or changing cutting inserts.

It is another object of the invention to provide an improved tool holder which provides for very economical consumption of the expensive cutting insert material, because only a minimum amount of such material is required for locking the cutting insert in the tool holder, thus providing for the maximum of productive use of such material.

It is another object of the invention to provide an improved metal cutting assembly having improved metal chip-breaking means which is independent of the cutting insert, which is adjustably mounted independently of the remainder of the assembly and may be adjusted without interfering with the setting of the remainder of the assembly, and wherein metal chips formed during a metal cutting operation are prevented from becoming lodged between the cutting insert and its associated parts, particularly the chip-breaking means, which would adversely affect the operation of the cutting assembly.

It is a very important object of this invention to provide an improved metal cutting assembly having indexible or replaceable cutting inserts and improved metal chip-breaking means which is independent of the cutting inserts, wherein the chip-breaking means may be set, and thereafter cutting inserts may be indexed or replaced without disturbing the setting of the chip-breaking means.

The above and other objects and further details of that which I believe to be novel and my invention will be clear from the following description and claims taken with the accompanying drawing, wherein:

FIG. 1 is a top plan view of the improved cutting assembly;

FIG. 2 is a perspective view of a cutting insert which forms a part of the cutting assembly;

FIG. 3 is an end elevational view looking in the direction of the arrow in FIG. 1;

FIG. 4 is a front elevational view thereof;

FIG. 5 is a sectional view taken substantially on line 5—5 of FIG. 1;

FIGS. 6, 7 and 8 are, respectively, side elevational, top plan and front elevational views of the clamping and chip-breaking plate which forms a part of the cutting assembly;

FIGS. 9 and 10 are, respectively, top plan and front elevational views of the anvil which forms a part of the cutting assembly;

FIG. 11 is a top plan view of a modified form of cutting assembly;

FIG. 12 is a perspective view of a cutting insert which forms a part of the FIG. 11 cutting assembly;

FIG. 13 is a sectional view taken substantially on line 13—13 of FIG. 11;

FIG. 14 is a front elevational view of the FIG. 11 cutting assembly;

FIG. 15 is a sectional view taken substantially on line 15—15 of FIG. 11;

FIG. 16 is a perspective view of the anvil which forms a part of the FIG. 11 cutting assembly, and FIGS. 17, 18 and 19 are, respectively, side elevational, top plan and front elevational views of the clamping and chip-breaking plate which forms a part of the FIG. 11 cutting assembly.

In the drawings, two embodiments of cutting assemblies which incorporate the invention are illustrated. In FIGS. 1–10, there is illustrated an embodiment of the invention which utilizes cutting inserts which are generally square. In FIGS. 11–19 there is illustrated an embodiment of the invention which utilizes generally triangular cutting inserts. The basic principles on which both embodiments are predicated are the same, and it should be clearly understood that any shape cutting insert, such as circular or other polygonal shape, may be used.

The cutting assembly of FIGS. 1–10 comprises a tool holder having an elongated shank 10, a tool holder head 12 formed at one end of the shank, the other end 14 of which is adapted to be mounted in a suitable support, such as the tool post of a lathe, planer, shaper, or other high speed metal cutting machine tool. The tool holder may be made of a suitable heat-treated alloy steel.

The tool holder shank includes spaced parallel top and bottom walls 16, 18, respectively, spaced parallel front and back walls 20, 22 respectively, and an end wall 24 which is inclined relative to the front and rear walls. In the vicinity of where the front wall 20 and end wall 24 would intersect if extended, an inclined wall 26 is formed.

Spaced from the end wall 24 and formed on the top wall 16 is a triangular step 28. Step 28 has a side surface 30 which is generally parallel to the end wall 24.

The wall portion of the tool head 12 between the step 28 and the end wall 24 is inclined slightly downwardly from rear to front, and indicated by reference numeral 32.

In the corner of the tool holder head 12 in the area where the walls 24, 26 and 32 meet, a generally square notch 34 is formed. The notch 34 is formed by a bottom surface 36 and side surfaces 38 and 40 which are perpendicular to bottom surface 36 and each other. Centrally of the bottom surface 36 there is formed a downwardly extending threaded bore 42 for receiving an anvil screw. Also, a pair of spaced, downwardly extending threaded bores 44 and 46, respectively, are formed in the tool holder head 12 through the wall 32 for receiving clamping and adjusting screws.

The anvil 48, which is generally square, has spaced, flat parallel top and bottom walls, slightly downwardly tapered side walls 50 which are beveled at their lower edges, and a central countersunk bore 52, is rigidly supported in the notch 34 by having its bottom wall rest on the bottom surface 36 of the notch by the countersunk anvil screw 54. When fully mounted, the anvil 48 has the upper peripheral portions of two of its sides 50 in firm engagement with lower portions of notch surfaces 38 and 40. The anvil is made of a very hard material, such as a carbide or a hardened and ground metal, and constitutes a seat for the indexible, disposable and replaceable cutting insert 56.

The cutting insert 56, which is illustrated as being generally square with slightly rounded corners, is made of a very hard material, such as tungsten carbide, other carbide, cutting steel or the like. The cutting insert 56 has spaced, flat, parallel top and bottom walls 58 and 60, respectively, and flat side walls 62, each parallel pair of which is perpendicular to each other and to the top and bottom walls. The cutting insert 56, or any other cutting insert which is similarly configured, is mounted in the notch 34 so as to have its bottom wall 60 contiguous with the top wall of the anvil 48, and in substantial planar contact therewith, and to have two of its adjacent side walls 62 in firm engagement with upper portions of the notch surfaces 38 and 40. As can best be seen in FIG. 1, when the cutting insert is so mounted, one of its side walls 62 extends beyond the front of the tool holder head 12 so as to be spaced from the wall 26 thereof, and an adjacent side wall 62 extends from the end wall 24 and is spaced therefrom. The two extending side walls 62 are in cutting position and form perpendicular cutting edges which may be used in a known manner to perform a cutting operation. It should be noted, that as the cutting insert side walls 62 which are in cutting position become worn and dull through use, the cutting insert may be indexed, i.e. turned so as to bring unused side walls 62 into cutting position, and the fresh side walls 62 may be used until they become dull; when all of the side walls 62 are worn, the cutting insert may be disposed of and replaced with a new cutting insert.

Above the tool holder head wall 32 and slidably mounted thereon is an integral clamping and chip-breaking plate 64 which may be made of a heat-treated alloy steel and is illustrated by itself in FIGS. 6, 7 and 8. The plate 64 performs multiple functions, including those of clamping the cutting insert 56 firmly against the anvil 48 in operative position relative thereto and providing adjustable chip control means. By reference to FIGS. 6, 7 and 8 it will be observed that the plate 64 is formed so as to have a main portion 66 and a side portion 68. Portions 66 and 68 are both generally planar, and are integrally joined at their rear and spaced at their front by the slot 70. Portion 66 has an oval-shaped opening 72 formed therein, and portion 68 has an oval-shaped opening 74 formed therein. The top wall of the portion 66 is inclined at its front and hardened or hard faced to form a chip-breaking face 76. Surface 76 may be hard faced with a suitable material such as carbide to resist chip erosion. A lateral end of the face 76 is beveled at 78 to form a lateral chip-breaking portion. The rear of the top wall of the portion 66 is cut away at 80 and the middle of the bottom wall of portion 66 is cut away at 82. The front of the bottom wall of portion 66 is inclined very slightly at 84 to form with the face 76 a sharply pointed edge 86.

The plate 64 is mounted on the exterior of the tool holder head so as to have its bottom rest on the inclined wall 32 and to have the side wall 88 of the plate portion 68 in contact with the surface 30 of the step 28. When so position, as can best be seen in FIG. 1, the side wall 90 of the plate portion 66 is generally coincident with the tool holder head end wall 24. The plate 64 may be slid rearwardly and forwardly on the wall 32 so as to bring its openings 72 and 74 into registry with the threaded bores 44 and 46 formed in the tool holder head. It will be understood that the plate 64 is positioned after the anvil 48 has been rigidly mounted in the notch 34 and the cutter 56 has been properly mounted in the notch. When the plate is so positioned: (1) the clamp lock screw 92, which is illustrated as having an hexagonally socketed head 94, and a washer 96 adjacent to its head, is passed through the plate opening 72 and threadedly secured in the threaded bore 44 (see FIG. 5) and (2) the chip-breaking adjusting screw 98, which is illustrated as having an hexagonally socketed head 100, is passed through the plate opening 74 and threadedly secured in the threaded bore 46 (see FIG. 4). The securement of the screws is effected by the use of an appropriately headed tool.

When the plate 64 is mounted in this manner, the bottom wall 102 of its portion 68 and the bottom wall 104 of its portion 66 to the rear of the cut-away portion 82, are in firm planar contact with the tool holder head surface 32. Most of the plate portion 66 forwardly of the bottom wall portion 104 is spaced above the tool holder head surface 32 and the top wall 58 of the cutter insert 56. However, the pointed edge 86 of the plate portion 66 is biased into firm line contact with the top wall 58 of the cutting insert 56. Adjustment of the position of the plate 64 to change the relative position of the chip-breaking face 76 to the cutting insert 56 may be effected by loosening the screws 92 and 98, adjusting the position of the plate 64 relative to the tool holder head 12 and the cutting insert, and then tightening the screws. It will, therefore, be observed that the plate 64 provides a large variety of dispositional relationships between the chip-breaking face 76 and the cutting insert 56, and its cutting edge formed by its extending side wall 62. It should be particularly observed, however, that regardless of such dispositional relationship, the chip-breaking face 76 cooperates with the cutting insert 56 so as to prevent the entry of metal chips between the plate portion 66 and the top wall 58 of the cutting insert. This results from the firm line contact between the pointed edge 86 and the top wall 58 of the cutting insert. This contact is analogous to a "biting" or "digging" effect, and is afforded by the somewhat flexible nature of the front of the plate portion 66, which results from the weakening effect of the cut-away portions 80 and 82 thereof, and the biasing effect of the clamp lock screw 92. It will, therefore, be observed that the plate portion 68 and the rear of the plate portion 66 constitute means for solidly anchoring the plate 64 to the tool holder head, and the front of the plate portion 66 constitutes means for clamping the cutting insert securely in operative cutting position on the tool holder head and chip-breaking means which is somewhat flexible and may be biased into firm line contact with the cutting insert to form an adjustable chip control means therefor which prevents entry of metal chips therebetween.

It should be particularly observed that the plate 64 affords the additional operational convenience and advantage of permitting a particular setting of the chip-breaking face 76 to be selectively made, and thereafter allowing cutting inserts to be indexed or replaced without disturbing the position of the chip-breaking face. This is effected by initially setting the plate 64 in the desired position relative to the tool holder head and cutting insert, and thereafter, when it is desired to index or change the cutting insert, loosening the clamp lock screw 92 until the bias on the front of plate portion 66 and the consequential pressure on the cutting insert are relieved, at which time the cutting insert may be withdrawn, and either indexed or replaced. Thereafter, tightening of the screw 92 results in clamping the cutting insert in its operative position. Throughout the foregoing manipulation, the tightened screw 98 retains the plate 64 firmly in its position to which it was originally set; therefore it is not necessary to reset the plate, for its setting is not affected by the replacement or indexing of cutting inserts in this manner.

In view of the foregoing, it will be apparent that an improved cutting assembly has been provided which has the following advantages; selectively, manually adjustable chip-control means is provided; a minimum number of securely mounted, interchangeable parts is used; a single part is utilized for effecting both chip-breaking and clamping functions, wherein the chip-breaking setting is fixed and the indexing or replacing of cutting inserts thereafter does not alter the chip-breaking setting; a wide range of styles and sizes of cutting assemblies can be effected, and the rake of the cutting insert may be positive, neutral or negative by simple alterations of the tool holder head, and maximum utilization of the expensive material of which the cutting insert is made is achieved, both by minimizing breakage due to the improved mounting of the cutting inserts and by providing for a minimum amount of such material to be needed to clamp the cutting insert in position.

In FIGS. 11 to 19 there is illustrated another embodiment of the invention, wherein generally triangular cutting inserts are used. Corresponding parts in the second embodiment will be designated by the same reference numerals as those used in the first embodiment, with a prime (') added, and any significant differences in construction will be explained. The tool holder head 12', in addition to the step 28' and inclined wall 32', includes a spaced, second step 106 having a wall 108 which is generally parallel to the wall 30' of the step 28'. As in the case of the first embodiment, the notch 34' is formed in the front upper corner of the tool holder head, but it is shaped so as to accommodate the side walls 62' of the triangular cutting insert 56', and the side walls 50' of the triangular anvil 48'. The anvil is mounted in a generally similar manner as that of its counterpart in the first embodiment, as is the cutting insert 56'. The clamping and chip-breaking plate 64' is generally similar to its counterpart in the first embodiment, as is the cutting insert 56'. The clamping and chip-breaking plate 64' is generally similar to its counterpart in the first embodiment in construction and operation, except that its outline is altered to conform to that of the recess formed by the walls 30', 32' and 108. The plate portion 68' and the rear of the plate portion 66' are firmly anchored to the tool holder head 12' by the set screws 92' and 98', and generally operate in the same manner as their counterparts in the first embodiment. The front of the plate portion 64' is somewhat flexible and has a sharply pointed edge 86' and a hardened, chip-breaking face 76'. A generally triangular, flat foot portion 110 is formed at the underside of the front of the plate portion 66' which is adapted to be biased against the top wall 58' of the cutting insert 56' to firmly clamp the cutting insert against the anvil 48' and also function as a chip-breaking face which prevents metal chips from entering between the plate 64' and the cutting insert. It will be understood by those skilled in the art that the cutting insert 56' may have one of its side walls 62' selectively positioned to form a cutting edge which is spaced from the tool holder head 12', the anvil 48', and the front of the plate 64', and cooperates with the chip-breaking face 76' to operate in a similar manner to that of the first embodiment.

It should, therefore, be understood that the second embodiment is predicated on the same inventive concept as the first embodiment, is constructed and operates in a generally similar manner, and possesses the same general advantages.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A cutting assembly for a high speed machine tool comprising: a tool holder adapted to be supported by the machine tool and having a tool holder head; a cutting insert arranged to be removably supported is operating cutting position by said tool holder head so as to have a side thereof disposed to function as a cutting implement; said tool holder head having planar seat means for supporting said cutting insert; an integral clamping and chip-breaking plate removably secured to said tool holder head on the exterior thereof; said plate comprising a mounting portion removably secured to said tool holder head and a laterally displaced spaced flexible clamping and chip-breaking portion partially separated from said mounting portion whereby said plate portions are capable of independent movement relative to each other, said clamping and chip-breaking portion arranged to bias and rigidly clamp said cutting insert against said planar seat means and having a chip-breaking portion disposed adjacent to said side of said cutting insert in contact therewith and in position to break chips formed during a cutting operation; means for securing said mounting portion to said tool holder head; and means separate from said securing means for biasing said clamping and chip-breaking portion against said cutting insert to clamp it against said planar seat means, whereby said cutting insert may be clamped and unclamped by actuating said biasing means only without disturbing the mounting of said plate.

2. An assembly as defined in claim 1 wherein said cutting insert is plural-sided and each side thereof is arranged to be selectively used independently as a cutting implement, whereby said cutting insert is indexible and said clamping and chip-breaking plate permits indexing of said cutting insert by operating the means for biasing said clamping and chip-breaking portion only without disturbing the means for securing said mounting portion.

3. An assembly as defined in claim 1 wherein said plate has a pair of spaced slots, one in each of said plate portions; said tool holder head has a pair of similarly spaced threaded bores in registry with said slots; and a pair of adjustable screws are provided, one adjustably secured in each registered slot and bore; whereby said plate is arranged to be rigidly clamped by said screws against said tool holder head and said cutting insert, and said cutting insert may be replaced by loosening the screw which passes through said clamping and chip-breaking portion to thereby permit such cutting insert replacement without disturbing the setting of said chip-breaking portion.

4. An assembly as defined in claim 1 wherein said seat means includes an anvil of hard material that is removably and rigidly supported by said tool holder head.

5. A cutting assembly for a high speed machine tool comprising: a tool holder comprising an elongated shank adapted to be supported by said machine tool at one of its ends and having a tool holder head formed at its other end; a notch formed in an upper corner of said tool holder head; said notch having a flat bottom wall and flat side walls; a polygonal-shaped anvil rigidly mounted in said notch on said bottom wall; a generally similarly polygonal-shaped cutting insert supported in said notch on said anvil and having some of its sides in contact with said side walls and one of its sides extending beyond said tool holder head to a position wherein it functions as a cutting implement; an integral clamping and chip-breaking plate adjustably and removably secured to the top of said tool holder head on the exterior thereof; said plate having two spaced portions comprising a rigid mounting portion that is removably but firmly anchored to said tool holder head, and a somewhat flexible chip-breaking portion which is disposed adjacent to said one of said sides and biased into contact with said cutting insert to thereby clamp said cutting insert in operative position and also function to break chips formed during a cutting operation; means for securing said mounting portion to said tool holder head; and means separate from said securing means for biasing said chip-breaking portion against said cutting insert whereby said cutting insert may be indexed or replaced by operating only said biasing means without disturbing said securing means or the setting of said plate.

References Cited in the file of this patent
UNITED STATES PATENTS

| | | |
|---|---|---|
| 2,181,023 | Moore | Nov. 21, 1939 |
| 2,559,352 | Edgar | July 3, 1951 |
| 2,710,442 | Ranous | June 14, 1955 |
| 2,799,079 | Brigner | July 16, 1957 |
| 2,930,111 | St. Clair | Mar. 29, 1960 |
| 2,962,800 | Swenson | Dec. 6, 1960 |
| 2,967,345 | Novkov | Jan. 10, 1961 |

FOREIGN PATENTS

| | | |
|---|---|---|
| 989,307 | France | May 23, 1951 |